B. ADRIANCE & A. CALLESON.
BOTTLE SEALING MACHINE.
APPLICATION FILED NOV. 4, 1910.

1,096,521.

Patented May 12, 1914.
8 SHEETS—SHEET 3.

WITNESSES:

INVENTORS,
Benjamin Adriance
and Amos Calleson,
BY
ATTORNEY

B. ADRIANCE & A. CALLESON.
BOTTLE SEALING MACHINE.
APPLICATION FILED NOV. 4, 1910.
1,096,521.
Patented May 12, 1914.
8 SHEETS—SHEET 4.
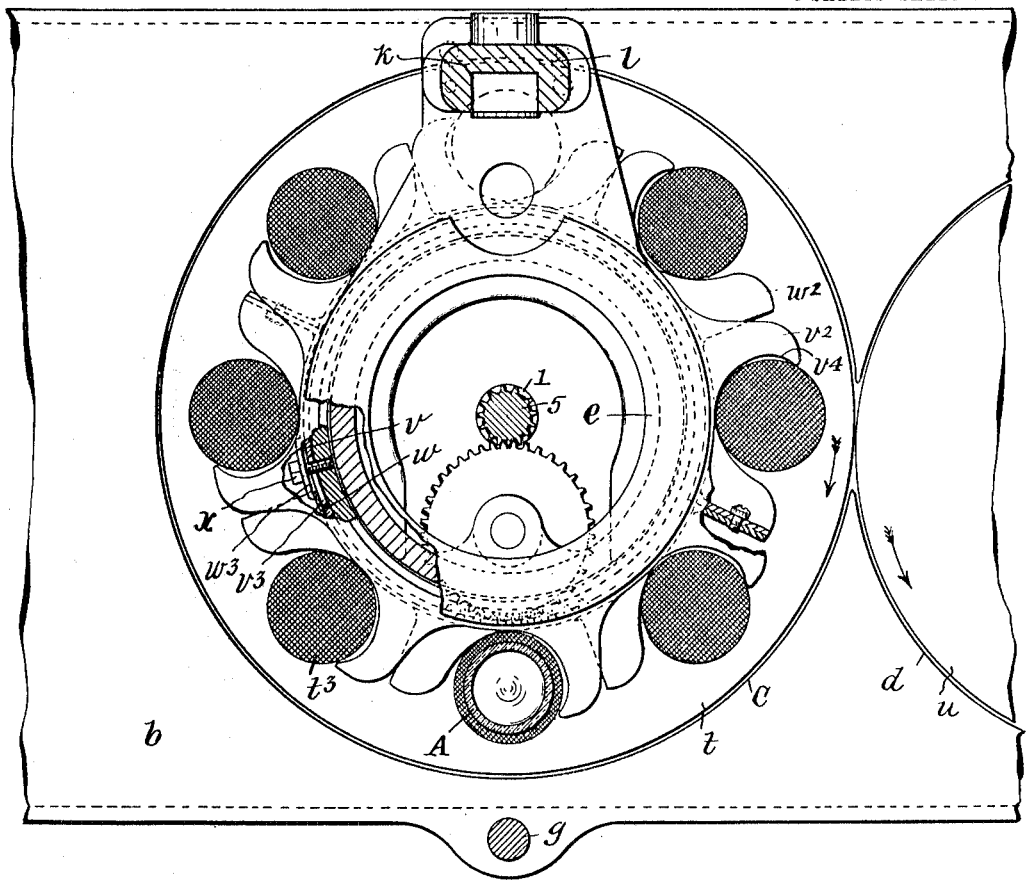
Fig. 4.
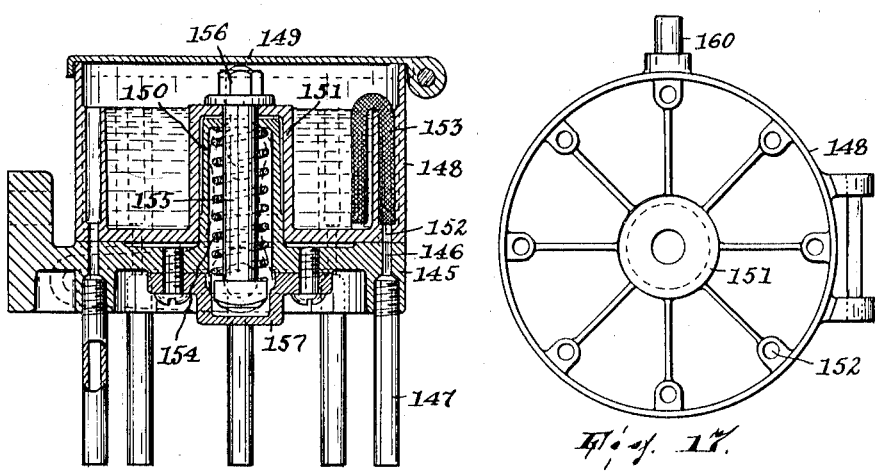
Fig. 16.
Fig. 17.
WITNESSES:
INVENTORS,
Benjamin Adriance
and Amos Calleson,
BY
ATTORNEY

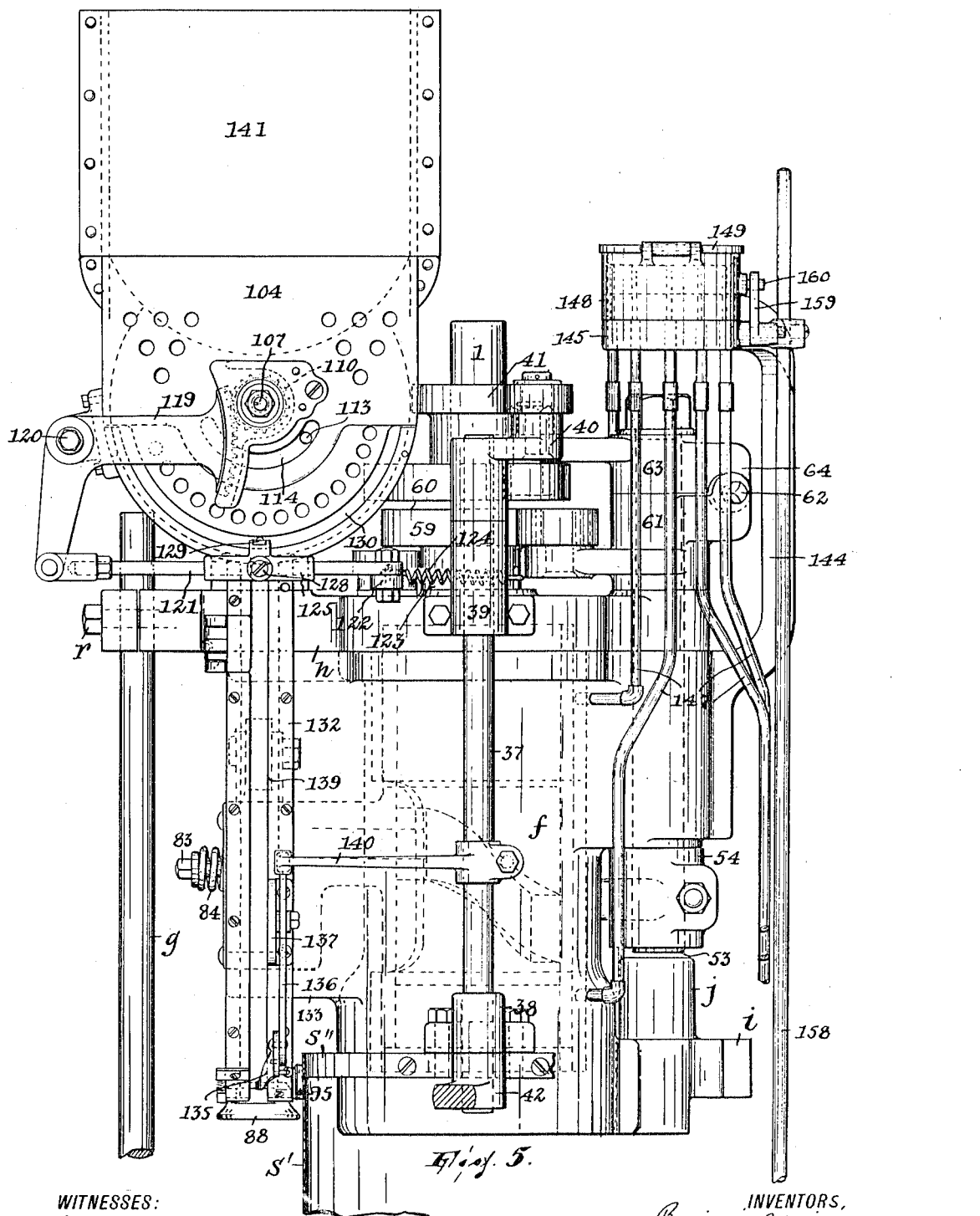

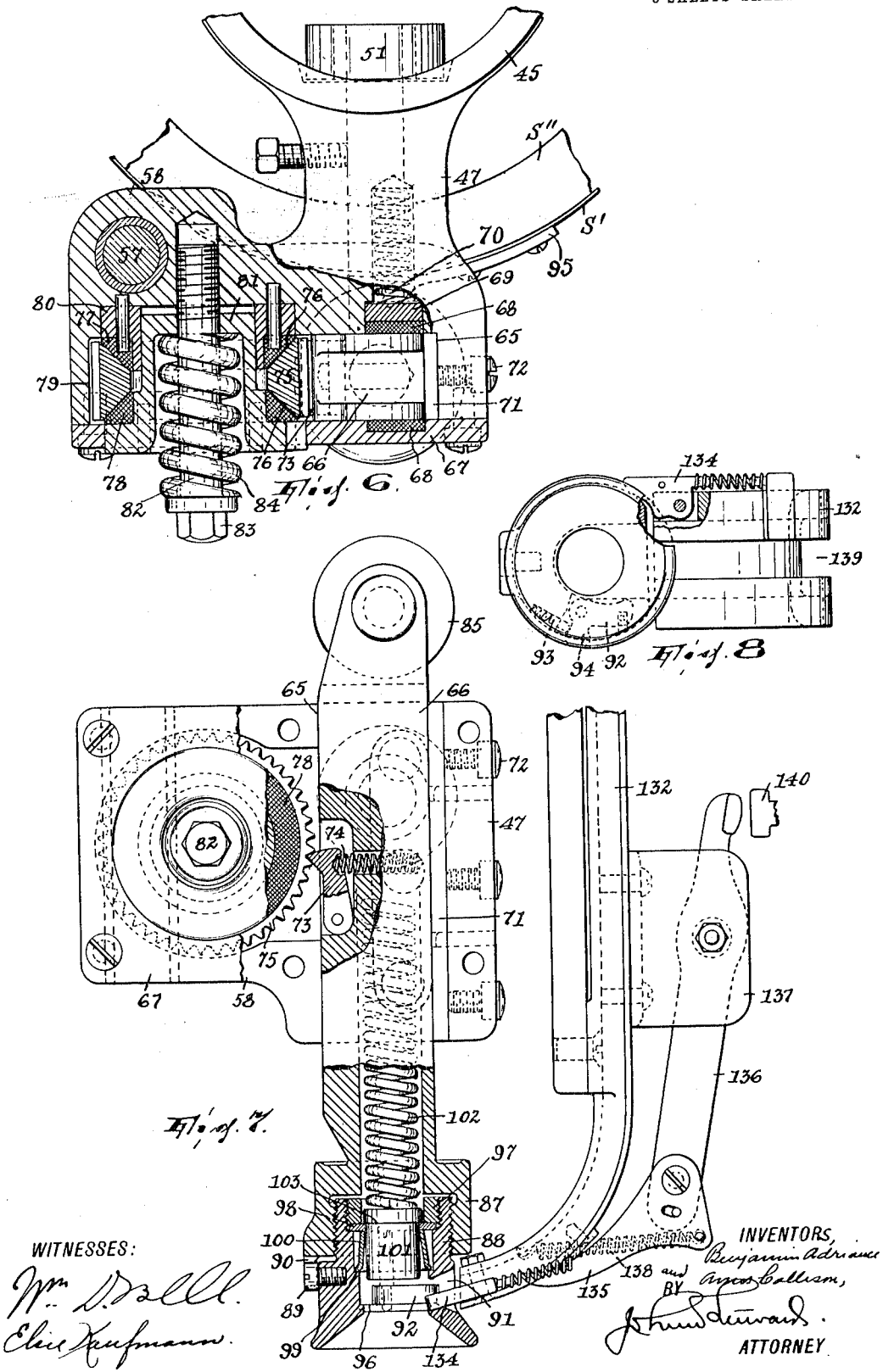

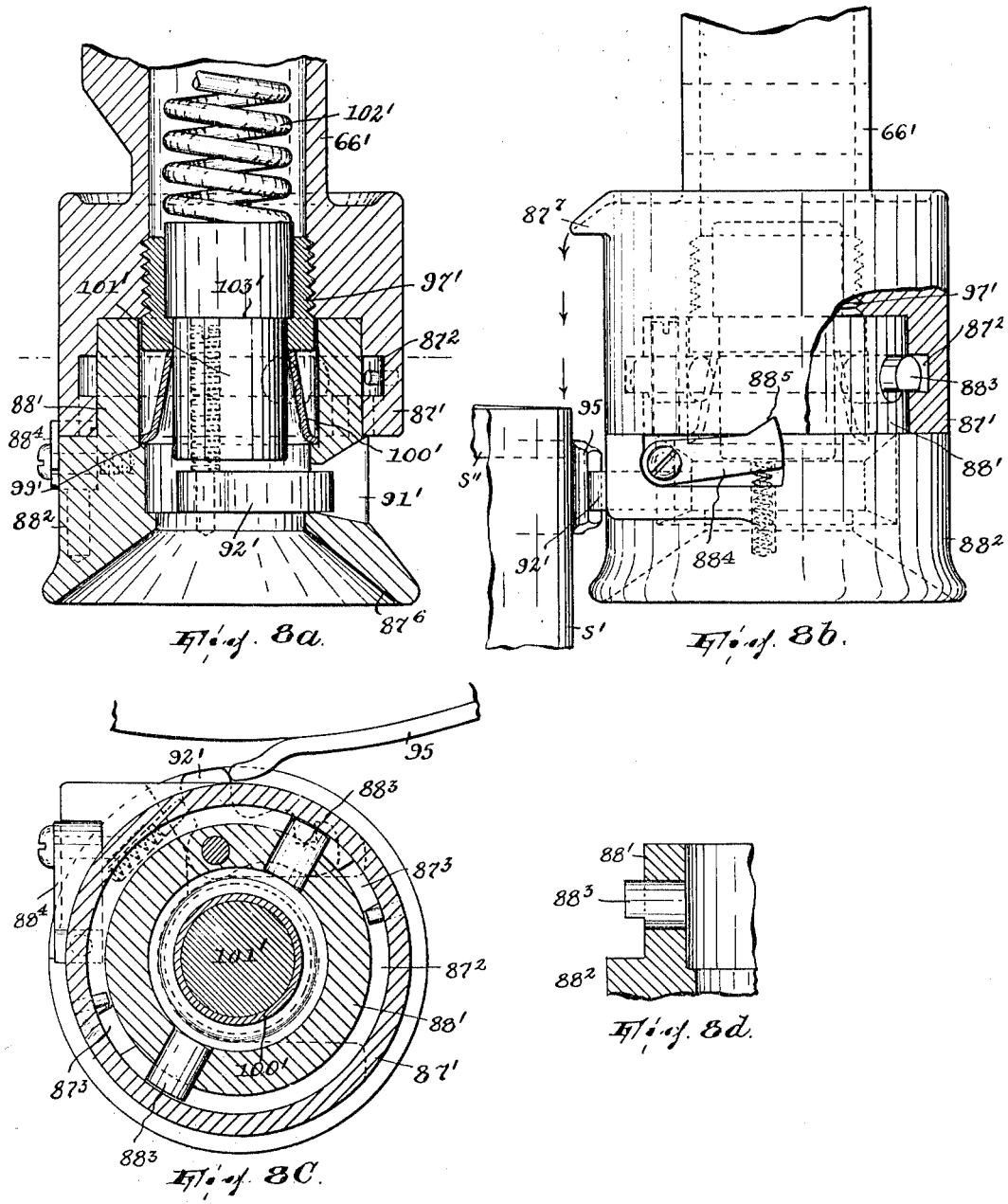

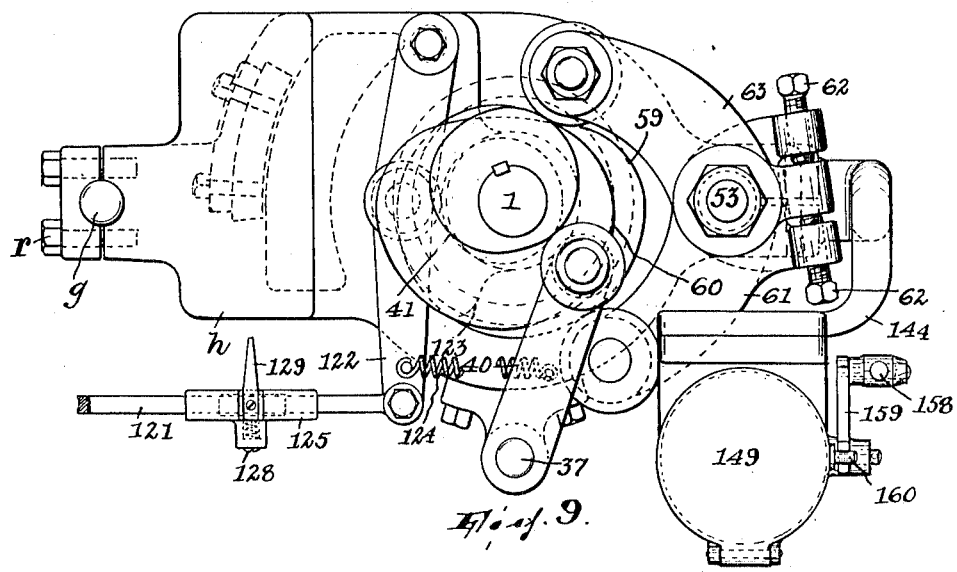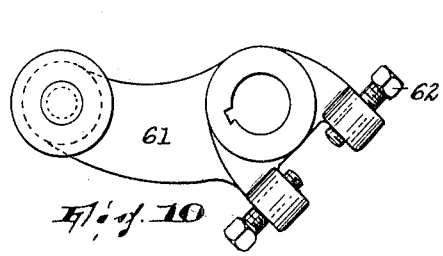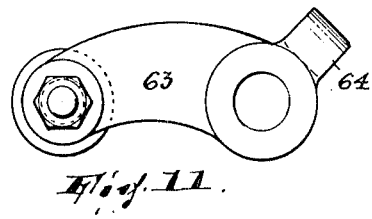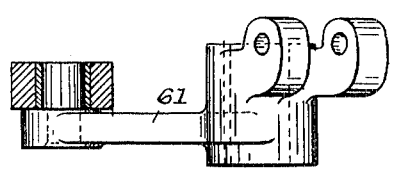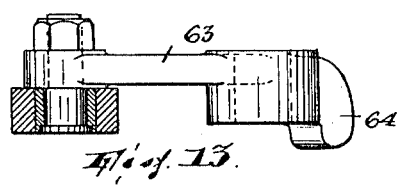

UNITED STATES PATENT OFFICE.

BENJAMIN ADRIANCE AND AMOS CALLESON, OF BROOKLYN, NEW YORK; SAID CALLESON ASSIGNOR TO SAID ADRIANCE.

BOTTLE-SEALING MACHINE.

1,096,521. Specification of Letters Patent. Patented May 12, 1914.

Application filed November 4, 1910. Serial No. 590,661.

*To all whom it may concern:*

Be it known that we, BENJAMIN ADRIANCE and AMOS CALLESON, citizens of the United States, residing in Brooklyn, borough of Brooklyn, and State of New York, have invented certain new and useful Improvements in Bottle-Sealing Machines; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to machines for sealing bottles and similar containers, and it consists in certain improvements in such machines having for their principal objects to render the mechanism substantially completely automatic and so to construct the machine that its several operations will be performed with very considerable expedition, whereby to increase the output of the machine while reducing the operating cost.

Figure 1:
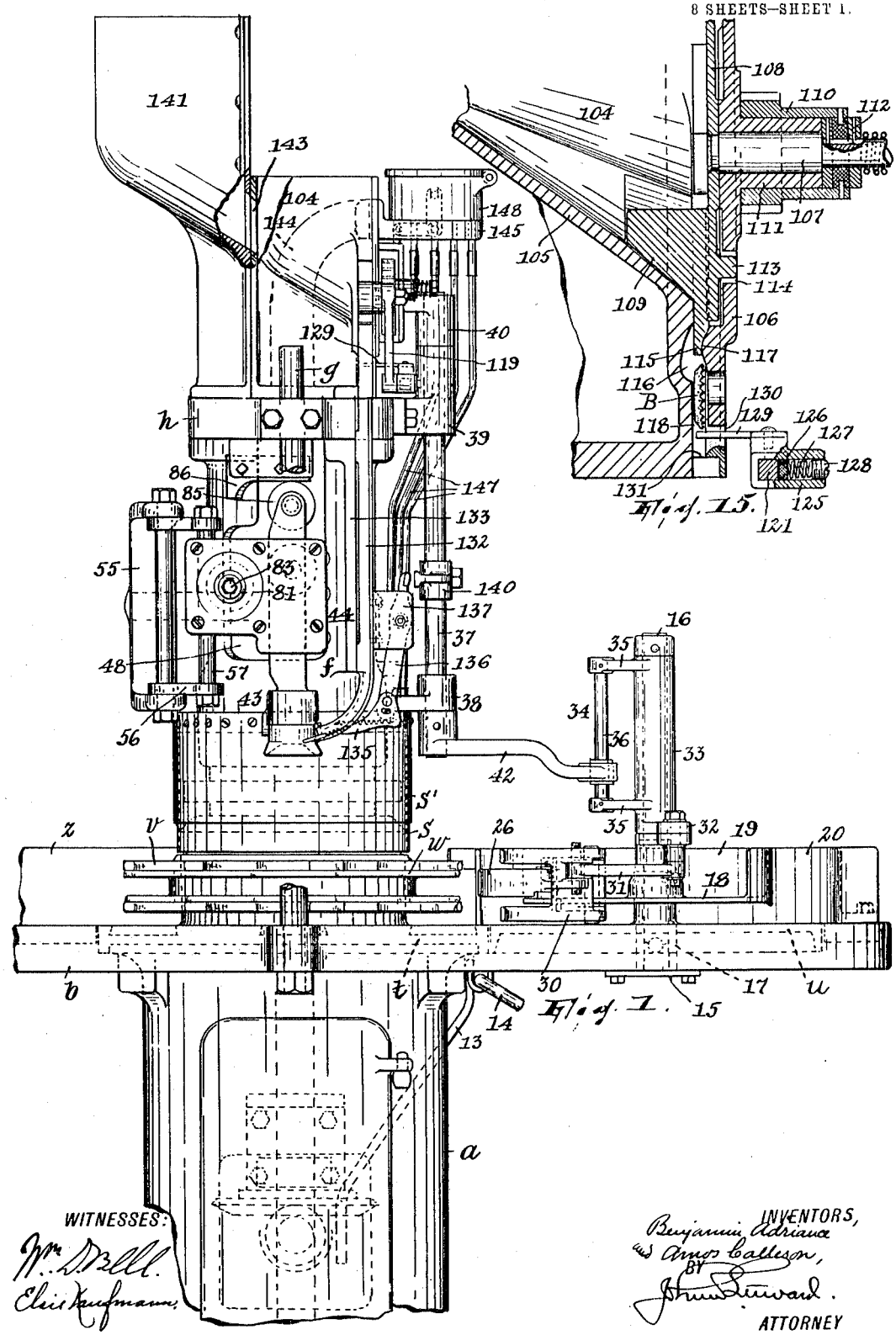
Figure 2:
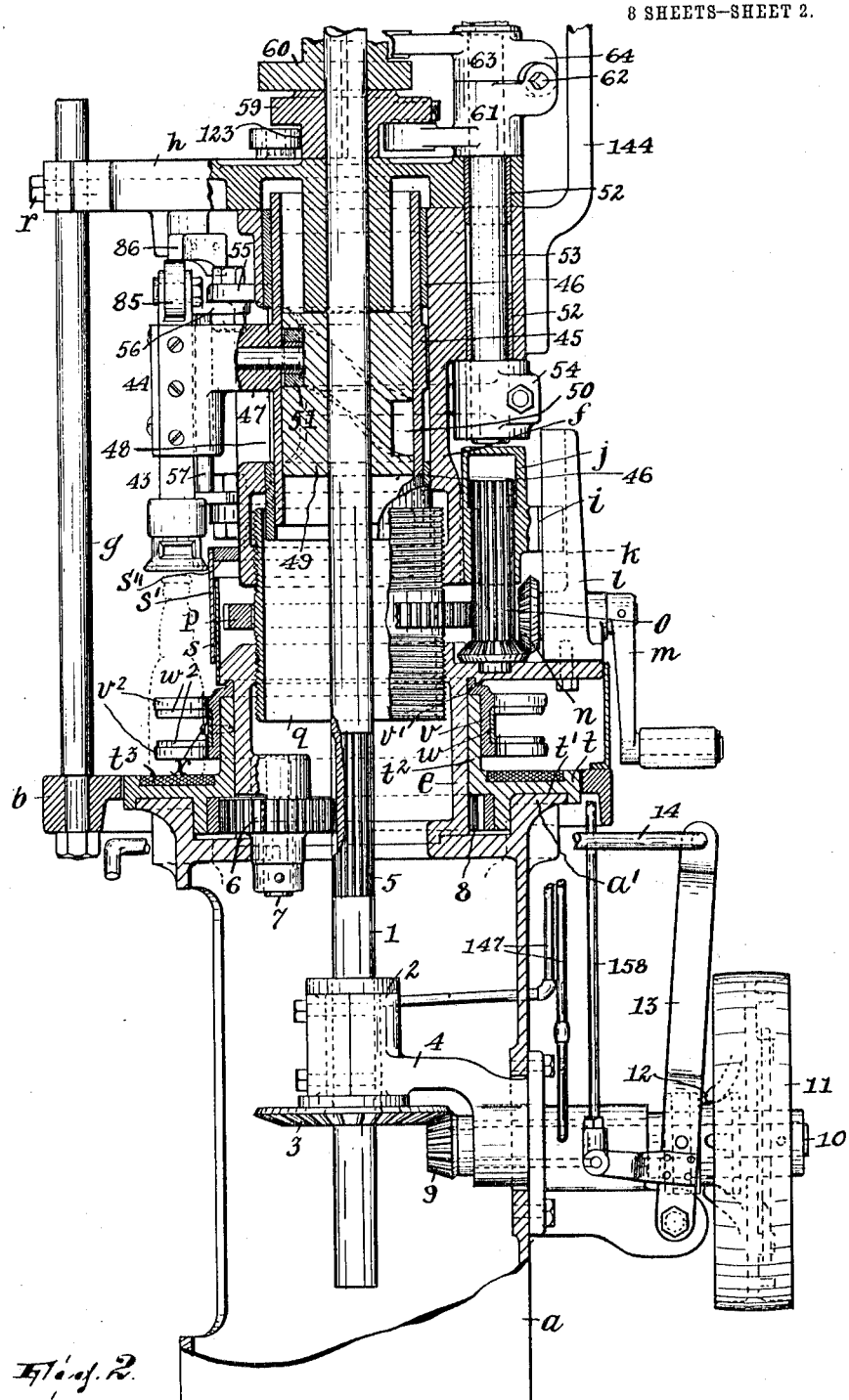
Figure 3:
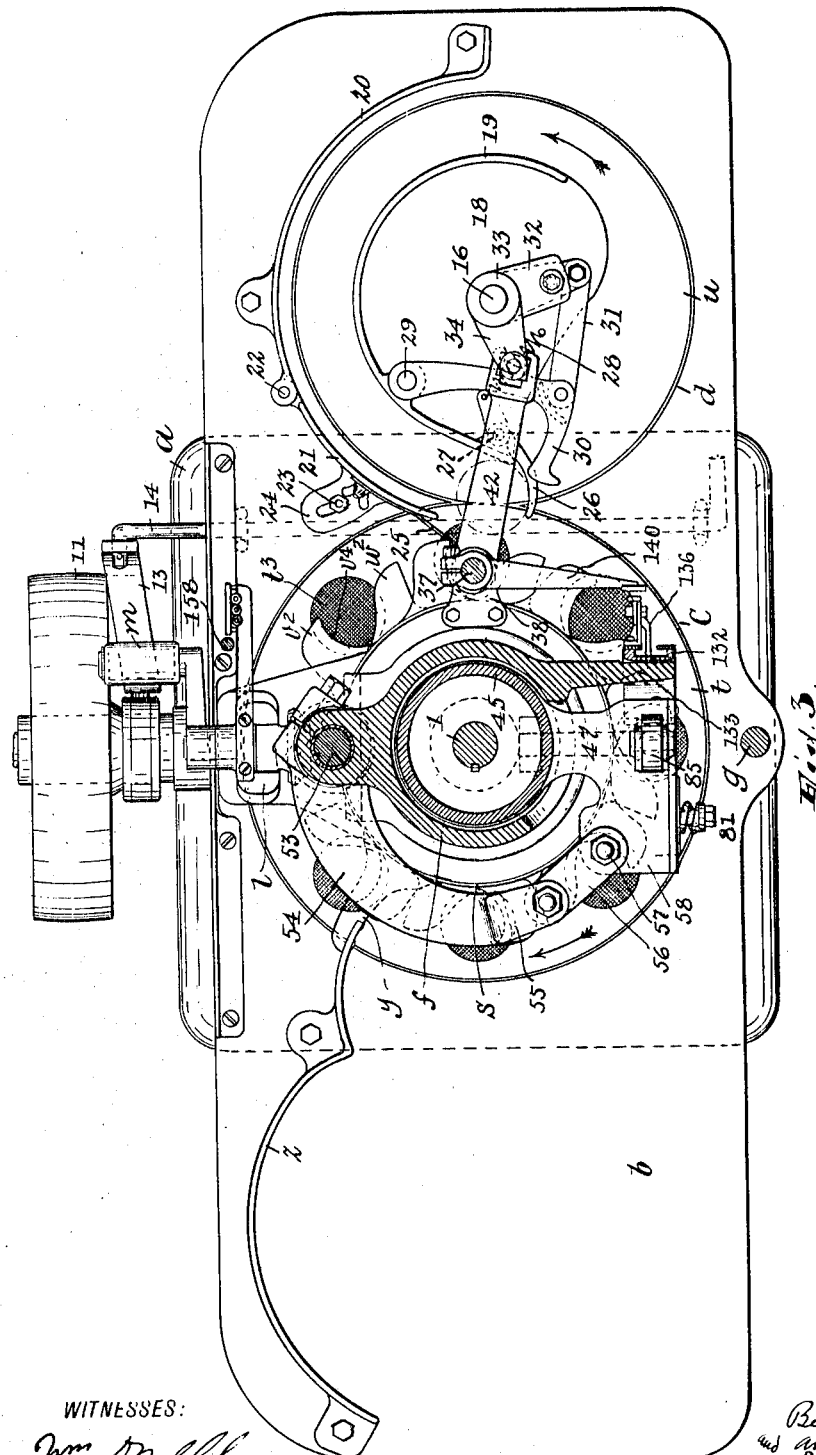

The invention will be readily understood by those skilled in the art upon reference to the following detailed description of one adaptation thereof, when read in connection with the accompanying drawings, in which, Figure 1 is a front elevation of the improved machine, certain parts being broken away; Fig. 2 is a view partly in side elevation (as seen from the right in Fig. 1), certain parts appearing in vertical section in a plane coincident with the axis upon which the bottle turret rotates; Fig. 3 is a plan view of the improved machine, certain parts thereof appearing in section in a horizontal plane disposed just above the roller 85; Fig. 4 is a fragmentary plan view on a somewhat larger scale, showing certain parts broken away and others in horizontal section, a bottle also appearing in section; Fig. 5 is a view in side elevation (on substantially the same scale as that of Fig. 4, and viewing the machine from the right in Fig. 1) of that part of the machine which is above the table thereof, certain parts being broken away; Fig. 6 is a plan view, on a still larger scale, showing a part of the means for raising and lowering the sealing head, certain parts appearing in section; Fig. 7 is a view in front elevation of what is seen in Fig. 6, (certain parts appearing in section) and a portion of the means for directing and effecting the advance of the closures to the sealing-head; Fig. 8 is an underneath plan view of the sealing head and the means for directing the closures thereto; Figs. 8ª, 8ᵇ and 8ᶜ are views illustrating a modified form of the sealing head and the stem carrying the same; Fig. 8ᵈ illustrates a detail of Figs. 8ᵇ and 8ᶜ. Fig. 9 is a plan view of the superstructure of the machine, certain parts being broken away; Fig. 10 is an underneath plan view and Fig. 11 a top plan view of the two parts of an adjustable double crank shown in Fig. 9; Figs. 12 and 13 show side elevations, partly in section, of the crank-parts shown in Figs. 10 and 11, respectively; Fig. 14 is a side elevation, partly in section, of a lever 122, appearing in Fig. 9; Fig. 15 is a fragmentary vertical sectional view of the hopper for the closures and the means for assuring the feeding of the closures from the hopper, properly faced; and Figs. 16 and 17 are vertical sectional and top plan views of the lubricant holding and controlling means.

$a$ is the lower or base-portion of the frame of the machine and $b$ a table surmounting the same and having two circular openings $c$ and $d$, the former having its center coincident with the vertical axis of the base. The base has an upwardly projecting fixed cylindrical pillar $e$ forming a bearing for a turret (to be described in detail), and above the pillar is the head $f$ of the frame which is guided for vertical movement by a fixed vertical rod $g$ rising from the table at the front thereof and having a bearing in a top-plate $h$ surmounting the head $f$ and by a feather $i$ projecting from a housing $j$ (fixed to the head) into a vertical groove $k$ in the bracket $l$ bolted to the pillar $e$. The head $f$ is movable solely for the purpose of adjustment, in order to adapt the machine to bottles of differently graded heights, the adjustment being effected by turning a crank $m$ carrying a bevel-pinion $n$ and journaled in the bracket $l$; the pinion $n$ meshes with the beveled portion of a transmission pinion $o$ which is journaled in pillar $e$ and housing $j$ and has an elongated toothed portion which meshes with the gear $p$ of the screw $o$ formed in its upper and lower portions with reverse threads engaging internal threading in the pillar and head, in which it turns. Whenever the head is adjusted, it is secured in that position by manipulating the cap-screws r which clamp the bearing portion (made in two parts) of the top plate h to the rod g. A telescopic guard incloses the gearing n, o, q, the same comprising members s and s' respectively attached to pillar e and a ring s'' fixed to head f.

In the openings c and d are arranged the rotary bottle supporting disks t and u, respectively, the same peripherally engaging each other and forming moving portions of the table. The disk t has a circular groove t' in its under face receiving the circular bearing portion a' of the base a, and it also has the sleeve $t^2$ closely but rotatably fitting the pillar e. The disk t is fitted with elastic bottle supporting pads $t^3$, and it forms a part of the aforesaid turret. This turret in constructed so as to facilitate bringing the bottles into and maintaining them in the control thereof during a part of its cycle of movement and then discharging them, as follows: Fitted to the sleeve $t^2$ is an annular member v supported by its flange v' which overhangs the top of the sleeve $t^2$; fitted to the member v is an annular member w (made in two parts, to permit the assembling, as seen in Fig. 4). The members v and w each have two sets of radial projections $v^2$ and $w^2$, respectively, the member w being disposed between the sets of projections $v^2$ of the member v (Fig. 2). Slots $v^3$ and $w^3$ are formed in the members v and w and these are penetrated by a screw x whereby to secure the members so as to alter the distance between any two corresponding projections $v^2$ and any two corresponding projections $w^2$ (Fig. 4), to suit the diameter of the bottles being operated upon. The bottles are shifted from the one to the other of the rotating disks u and t, whose directions of rotation are indicated in Fig. 3 by arrows, and in order to retain them on the disk t and facilitate their coming within the control of the turret, the forward edges of the projections $v^2$ are concave, as at $v^4$. After the bottles have been sealed they are successively discharged from the turret, being wiped off the disk t by the fixed deflector y which forms a part of a guard z at the back of the table b.

The top plate h forms a bearing for a vertical shaft 1 which is supported therein against downward movement by a series of four cams fixed to the upper end of the shaft and bearing upon the top plate; the function of these cams will be explained later. The said shaft 1 penetrates the sleeve portion 2 of a bevel gear 3 journaled in a bracket 4 arranged within the base a, the shaft being splined to the sleeve 2. A portion 5 of the shaft is formed with teeth so as to form an elongated pinion, and with this pinion meshes a transmission pinion 6 suitably journaled on a stub-shaft 7 depending from the pillar e, the pinion 6 being in mesh with an internal gear 8 formed in the turret, the elongation of the teeth 5 and the splining of shaft 1 within sleeve 2 having for their purpose to permit the shaft 1 to remain in operative connection with the sleeve and the turret whatever elevation the shaft may assume in the adjustment of the head f. The bevel-gear 3 meshes with the pinion 9 on the drive shaft 10, said shaft carrying a pulley 11 adapted to receive a driving belt and to assume either a fixed or a free relation with respect to the shaft according to the condition of a clutch 12 controlled by the clutch lever 13 provided with an operating handle 14.

A cross-piece 15, bolted to the under side of the table b, spans the opening d, and from it rises vertically the fixed shaft 16. On a spacing collar 17 arranged on this shaft and supported by the cross-piece is journaled the disk u, which is rotated from disk t with which it peripherally engages. Fixed to the shaft above and spaced from the disk is a plate 18 of less diameter than the disk, the back portion of said plate being formed as a substantially semi-circular wall 19.

20 is a semi-circular wall secured to the table b back of the disk u, the part 21 thereof being pivotally adjustable around the pin 22 upon manipulating a screw 23 which penetrates a slotted ear 24 of the part 21 and said part 21 having an elastic extension 25 projecting into close proximity to the outer ends of the projections $v^2$ and $w^2$ of the turret.

The bottles are placed on the table b and then moved onto the rotating disk u whereby they are carried in the direction of the arrow, following the circular path formed between the walls 19 and 20 until they approach the disk t. At this point a deflector 26 wipes them off of the disk u onto the disk t, that is, into the control of the turret; this deflector is pivoted in the wall 19 at 27 and, while its acting end will yield to the pressure of a bottle in contact therewith, it is normally held in the position shown by a spiral spring 28 connecting its other end with the plate 18. It being designed that the bottles shall be delivered to the turret in regularly spaced intervals, that is, each upon a pad $t^3$, the following means is provided for regulating the delivery of the bottles from disk u to the turret: On a vertical axis 29 is pivoted a gate 30 (appearing hook-shaped in plan) whose free end intermittently closes the discharge end of the passage formed between the walls 19 and 20. This gate 30 is connected by a link 31 with a crank 32 extending from a sleeve 33 having a crank 34 consisting of two arms 35 projecting from the sleeve and connected by a vertical rod 36, the sleeve being journaled on the shaft 16. A rock-shaft 37 is journaled in bearings 38 and 39 of the head $f$ and top plate $h$, respectively, the upper end of said shaft carrying a crank 40 having an anti-friction roller contacting with a cam 41 which is secured on the shaft 1. The lower end of said rock shaft carries a forked crank arm 42 whose forked end embraces the rod 36. On each rotation of shaft 1 the bell-crank lever formed by the sleeve 33 and its projecting arms is caused to move the gate 30 alternately into obstructing relation to the bottles within the passage between walls 19 and 20 out of such relation, in the latter instance permitting the most advanced bottle to be pushed by those behind it onto the adjoining pad $t^3$. To permit the proper coaction of the gate 30 and deflector 26, it is convenient and desirable to form the acting end of the former bifurcated (see Fig. 1), its bifurcated end receiving the deflector when the gate moves to obstruct the advance of the bottles. It will be understood that the crank 34 has the form described with the object of permitting an operative connection to exist at this point whatever position the arm 42 may assume in the adjustment of the head.

The actual operation of sealing bottles necessitates an intermittent movement of some kind in order to assemble each bottle and closure, such movement in the present instance taking the form of a thrust on the part of the sealing device toward and from the plane of movement of the bottle support (turret). The bottle support is given a continuous movement, as already indicated, the principal object of which is of course to hasten the progress of the work and thereby increase the output. In order that the intermittently acting sealing device may properly coöperate with the continuously moving bottle support we have found it expedient to cause the sealing head intermittently to accompany the bottle support in its advancing movement. We now proceed to explain the means for causing the sealing device and the bottle support to coöperate in the way just indicated: The sealing device, designated 43, in Figs. 1 and 2 is arranged in a carrier, designated 44 in said figures, which oscillates around the longitudinal axis of shaft 1 and has movement also in the length of said axis; the sealing device and the manner in which it and the carrier 44 are constructed to permit the automatic adjustment of the sealing device will be described later in detail. The carrier comprises a cylindrical portion or sleeve 45 working in cylindrical brasses 46 fitted in the head $f$ and an arm 47 which projects through an opening 48 formed in the front of the head $f$. Fixed to shaft 1 and fitting within the sleeve 45 is a cam 49 having a peripheral groove 50 which receives a roller 51 projecting inwardly from the sleeve 45. The cam 49, it will be observed, serves to impart vertical movement to the carrier 44; i. e., the aforesaid thrust of the sealing device toward and movement away from the advancing bottle support (turret). In brasses 52 arranged in the head $f$ and top plate $h$ back of shaft 1 is journaled a vertical rock-shaft 53; the lower end of this shaft protrudes from an overhang of the head $f$ in which the brasses are arranged, and on the protruding portion of the shaft is adjustably secured a crank 54 terminating in a yoke 55. This yoke carries a two-armed link 56, the arms of which in turn carry a pivoting pin 57 which penetrates the projecting portion 58 of the arm 47 of the carrier 44, which is movable vertically with reference to said pin. When rock-shaft 53 is oscillated it will impart the above-mentioned oscillating movement to the carrier 44 around the axis of shaft 1. The oscillating movements of rock-shaft 53 are accomplished from the cams 59 and 60 fixed on shaft 1 through the medium of the double crank shown in Figs. 10 to 13. One part or member 61 of this crank is keyed to the shaft, carrying a roller at one end bearing against the cam 59 and having its other end forked and provided with the set screws 62; the other part or member 63 of said crank is rotatably adjustable on shaft 53, carrying at one end a roller bearing against the cam 60 and at the other a projection 64 which fits between the set screws 62 in the forked portion of the member 61 of the crank. The oscillating throw of the carrier may be changed as circumstances require by changing the cams 59 and 60 for others of different size, such changes being permitted in view of the adjustability of the crank-member 63 and the crank 54. It will be observed that on each rotation of shaft 1 the carrier performs an up and down movement and a back and forth or oscillating movement around the axis of shaft 1. The arm 47 of the carrier has at the front a vertical groove 65 in which is fitted the stem 66 of the holder part of the sealing device. The front flat face of the arm 47 of the carrier is covered by a plate 67, and set in recesses in this plate and the back of the groove 65 are friction pieces 68 (of fiber or the like) which bear against the front and back faces of the stem, the friction piece at the back being pressed against the stem by a plate 69 against which bear springs 70 housed in the carrier. A friction-piece 71 also bears against one lateral face of the stem, its frictional action being adjustable by virtue of the set screws 72. In the face of the stem opposite to the friction-piece 71 is pivoted a pawl 73 pressed outwardly by a spiral spring 74. This pawl engages the teeth of an annular ratchet 75 having interior beveled faces 76 against which bear the beveled exterior faces of annular friction pieces 77 and 78. The ratchet 75 and the friction pieces 77 and 78 are housed in a cavity 79 of the projection 58 of the arm 47 of the carrier, and in this cavity are fitted a bushing 80 supporting the friction piece 77 and a cup 81 supporting the friction piece 78 and fitting the bushing, which latter is preferably pinned in its place, so as not to rotate. A fixed stem 82 projects from the cavity in the axis of the cup and ratchet, the same carrying at its outer end a nut 83 between which and the bottom of the cup is interposed a spiral spring 84. Upon adjusting the nut 83 the pressure of the spring will be varied to alter the friction or braking effect of the friction pieces 77 and 78 on the ratchet 75. The upper end of the stem 66 carries a roller 85 designed to impinge against a stop 86 secured to the top plate $h$ (Fig. 1).

It being remarked that bottles supposed to be of the same height often vary considerably, it will be understood that the purpose of frictionally supporting the sealing device as just described is to permit it to adjust itself automatically to bottles varying in height. Each time the carrier descends the sealing device 43 occupies its lowest elevation therein (so as to be adapted to a bottle having the minimum calculated height); if the sealing device does not already occupy that position on the previous rise of the carrier, it is made to assume the same by the contact of roller 85 with stop 86. If a bottle of greater height is presented to the sealing device, on the descent of the carrier the sealing device will slip therein (upwardly relatively to the carrier), the pawl 73 engaging a tooth of ratchet 75 and overcoming the resistance of the friction pieces 77 and 78. In the arresting of the sealing device by the contact of its roller with the stop 86, the pawl clicks idly over the teeth of the ratchet. It will be understood that the friction pieces 68 and 71 serve principally to hold the sealing device against downward shifting in the carrier due to the rather violent up and down movement of the latter in connection with the action of gravity on the sealing device.

The stem 66 terminates at its lower end in an interiorly threaded chamber 87 into which is screwed a socket 88 which is held against rotation in the chamber by a screw 89 fitting a recessed projection 90 of the chamber. The socket 88 has a flaring mouth (Fig. 7) to facilitate the heads of the bottles entering the same, and it also has a lateral closure admitting opening 91. At one side of the throat of the socket is arranged a pivoted clip 92 normally forced inwardly by a spring-actuated pin 93 and having a projection 94 adapted to be engaged by a fixed lug 95 on guard-member $s'$ when the carrier returns the sealing device to its starting point; the engagement of the clip 92 with the lug 95 throws the former into the position shown in Fig. 8, so as to permit a closure to enter the opening 91 and rest upon an interior ledge 96 in the socket 88, and when the carrier moves away from its starting point (Figs. 1 and 3), the clip is forced by its spring into holding relation to the closure, so that the position of the latter in the socket 88 will not be disturbed in the movements of the sealing device. Into the top of the socket 88 is screwed an annular nut 97 against which bears an annular disk 98 between which and a shoulder 99 is disposed a substantially non-expansible, yet flexible, conical throat piece 100 forming the subject of our application for Letters Patent bearing the Serial No. 513564, filed August 19, 1909, the same not being claimed herein. A plunger 101, subjected to the pressure of a spring 102 housed in the stem 66, is normally supported by the disk 98 on which a shoulder 103 on the plunger engages. When the sealing device moves downwardly over the head of the bottle, the latter raises the closure already deposited in the socket 88 against the plunger 101 which yields upwardly (holding the closure squarely upon the mouth of the bottle) allowing the crimped flaring edge of the closure to rise in the throat piece 100 and be thereby contracted into locking engagement with the bottle head as described in our application aforesaid.

In the modification shown in Figs. 8$^a$ to 8$^d$ an internally shouldered nut 97' is screwed into the lower end of the bore of the stem 66', its shoulder offering a seat for the shoulder 103' of the plunger 101' pressed down by spring 102'. The chamber 87' at the lower end of the stem 66' is internally smooth (except for an annular groove 87$^2$ and vertical grooves 87$^3$ leading up to groove 87$^2$ from the mouth of the chamber) and in it fits the exteriorly smooth hollow plug 88' of a socket 88$^2$ having studs 88$^3$ received by the groove 87$^2$; the socket is thus connected with the stem by what is substantially a bayonet joint, it being held against turning by a spring-pressed pawl 88$^4$ engaging a notch 88$^5$ in the mouth of the chamber 87'. The throat-piece 100' stands interposed between the internal shoulder 99' of the socket and the nut 97'. Thus the socket may be removed at any time with facility and without disturbing the spring-pressed plunger 101' for access to the throat-piece or other purpose. The socket has the flaring mouth 88$^6$, closure-admitting opening 91' and closure-holding clip 92' all the same in construction and operation as the corresponding parts 88, 91 and 92 already described. In this modification the top of chamber 87' is annularly channeled and is formed with a lip 87¹ whereby any oil or the liquid finding its way from the bottles to parts of the machine directly above the sealing point will be discharged away from the sealing head and prevented from working its way into the interior of the latter and possibly into the bottles.

A (Fig. 4) designates a bottle and B (Fig. 15) designates the type of closure or cap employed. Each time the carrier returns to its starting position, a cap or closure is delivered thereto, and the means whereby this is accomplished is as follows: On the top plate $h$ is arranged a hopper 104 open at the front and having an inclined rounded bottom wall formed with a channel 105. The front (right) side of this hopper is open, being covered by a plate 106 in which is journaled a shaft 107 which carries (against the inner face of the plate) a disk 108 having a fin 109 which oscillates in the channel 105 during the oscillation of the disk with the shaft. A pinion 110, fitted over the hub 111 of the disk, has a slip-friction-grip connection 112 with the shaft 107, the oscillating movement of the disk being limited by a stud 113 working in a slot 114 in the plate 106. The fin has a downwardly projecting finger 115 entering the channel formed by a curved groove 116 in the front of the hopper below its bottom wall and a curved rib 117 on the back of the plate, the rib and groove coacting to permit a cap B to pass downwardly through the space 118 formed between the front of the hopper and the plate should the cap be faced as shown in Fig. 15 but to check the cap if it is faced oppositely. Merely remarking that the rejected caps are returned by the oscillating finger 115, which rolls them along the channel back into the hopper, further description of this mechanism is not necessary herein, it being fully set forth in our application bearing Serial No. 542297, February 15, 1910. The pinion 110 is engaged by the toothed segmental end of a lever 119 fulcrumed on a stud 120, and connected by a link 121 with the free end of a lever 122 carrying a roller which engages a cam 123 fixed on shaft 1, the lever being held against the cam by a spring 124. On the link 121 is arranged a block 125 having a slip-friction-grip on the link by virtue of a fiber piece 126 held in contact with the link by a spiral spring 127 kept under tension by a screw 128 tapped into the block; this block carries a finger 129 which enters an arc-shaped slot 130 in the plate 106 and in its reciprocations alternately pushes back from the mouth or entrance to the cap chute (to be described) all caps at one side of said chute and resting upon the ledge 131 closing the bottom of the space 118, so that the caps will not clog said mouth. 132 is the said cap chute, the same being secured to an outwardly projecting web 133 of head $f$. The lower end of the cap chute debouches toward and is alined with the opening 91 of the socket of the sealing device and it has a spring-actuated clip 134 normally acting to restrain the discharge of the caps therefrom, but being adapted to yield to permit the escape of a cap upon sufficient pressure being exerted upon the latter. The positive advance of the lowest cap past the clip 134 is effected by the pivoted foot 135 of a lever 136 fulcrumed in a bracket 137 projecting from the chute, the toe of the foot 135 being impelled toward the chute by a spring 138 connecting the foot with the chute, and the chute having a slot 139 which admits the foot 135 into engagement with the lowermost cap back of the same. The receding movement of the foot is accomplished by an arm 140 arranged on shaft 37 and adapted to engage the upper end of the lever 136. 141 is an auxiliary hopper having an inclined bottom and discharging through a passage 143 into the back of the hopper 104. Thus, while the capacity of the source of supply of the closures is increased, the weight of the bulk of the caps on those which are being subjected to the selecting operation is not so considerable as to interfere with that operation.

The cams 41, 59, 60 and 123, it will be understood, form that series of cams which it has been heretofore stated serve to support the shaft 1.

It is desirable that certain bearings of the machine be automatically lubricated, such, for instance, as the bearings for the turret, the shafts 10 and 15, the sleeve 45 and the gear 3. The lubricating means is shown in Figs. 1, 5, 16 and 17 and is as follows: A bracket 144 rises from the head $f$ and carries a disk 145 having a series of ports 146 to which are connected the tubes 147 leading to the several bearings. An oil-cup 148 having a cover 149 surmounts the disk 145, said disk having an upwardly projecting hub 150 on which is journaled the upwardly projecting bearing portion 151 of the cup. The cup is provided with ports 152, said ports and the ports 146 being arranged in an arc of the same circle and said ports 152 each receiving one end of a wick or other flexible absorbent strip 153, the other end of which depends into the cup. The adjoining faces of the disk and cup are planed smooth, and when the cup is turned on its axis communication between the ports 146 and 152 will be established or closed, leakage between the said members being prevented by a spring 154 coiled about a bolt 155 housed in the hub 150, the spring being interposed between the head of the bolt and the closed end of the hub, and the upper or protruding end of the bolt carrying a nut 156 for adjusting the tension of the spring. 157 is simply a cover plate for the head of the bolt. When the machine is idle the cup stands in the position in which it cuts off the flow of the lubricant which, it will be understood, is fed to the ports by capillary attraction; when the machine is running, the cup is moved so as to permit the flow of the oil. The rotary movement of the cup is effected from the lever 13 through a pitman 158 connected with a bell-crank lever 159 engaging a stud 160 on the side of the cup, the connection between the pitman and lever being of the slip-friction-grip character to allow adjustment of the head $f$ and being substantially identical to that shown at the lower right portion of Fig. 15.

So long as the clutch maintains the pulley 11 in driving connection with the shaft 10, shaft 1 and all the parts it controls continue in motion. The duty of the attendant is confined simply to supplying bottles to the disk $u$ and removing them from the machine as fast as they are sealed, keeping the hoppers supplied with caps and replenishing the lubricant receptacle 148. As already explained, the bottles placed on the disk $u$ are carried thereby through the passage formed by the walls 19 and 20 and delivered onto the disk $t$, being caused to assume positions on the pads $t^3$, so that they stand at regular intervals from each other. As the bottles pass in succession in front of the head $f$ of the machine, the sealing mechanism operates intermittently, in each cycle of its movement receiving a cap from the means for supplying the caps thereto and affixing such cap to a bottle. So far as the sealing device is concerned, the resultant of the two movements of the carrier 44, to wit, an oscillatory movement around shaft 1 as a center and a vertical movement, is in a downwardly inclined direction toward the bottle support which the turret forms, such downwardly inclined movement occurring while the affixing is taking place and having for its effect to cause the sealing device to accompany the bottles at this time and at the same time effect the contraction of the closure by forcing the throat piece 100 down over the closure. Following the downwardly inclined movement, the sealing device rises and returns to its initial position, receiving another closure, preparatory to repeating the operation thereof just described with reference to the next bottle as it is brought in front of the head $f$. The sealed bottles are carried on the supporting disk $t$ until they engage the deflector $y$, which successively turns them off the support onto the table $b$. It will be understood that the plunger 101 serves to clear each bottle from the sealing device, keeping the bottle in contact with the pad $t^3$ until such clearance has been completely effected. When the sealing device descends into downwardly pressing engagement with the container, if necessary (depending upon the height of the bottle) it will yield relatively upwardly in the holding means therefor (carrier 43), subject to the resistance of the slip-friction-grip mechanism, operating thereon at this time; it will be observed that the pawl and ratchet means involved in the slip-friction-grip mechanism makes such slip-friction-grip operative during the working thrust of the sealing device but substantially inoperative during the return thrust, whereby to facilitate the return of the sealing device to its lowest position (relatively) in the holding means therefor upon impact of the sealing device with the stop upon each rise thereof.

We do not wish to be limited to the precise construction and arrangement of parts herein set forth for the purpose of illustrating one adaptation of our invention, as the same are susceptible, as will be obvious, of various changes.

Having thus fully described our invention, what we claim as new and desire to secure by Letters Patent is:

1. In a machine for assembling the body and closure parts of containers, coacting means for pressing said parts against each other, one of said means including a thrust-member having thrust movement toward and from the other means and being oscillatory on an axis extending longitudinally of its line of thrust movement and a pressure-exerting member carried by said thrust-member eccentrically of said axis, substantially as described.

2. In a machine for assembling the body and closure parts of containers, coacting means for pressing said parts against each other, one of said means including a thrust-member having thrust movement toward and from the other means and being oscillatory on an axis extending longitudinally of its line of thrust movement and a pressure-exerting member carried by said thrust-member eccentrically of said axis, and means for advancing the container-parts of one kind in a path extending between said other means and said member, substantially as described.

3. In a machine for assembling the body and closure parts of containers, in combination, coacting means, rotative on a common axis, for pressing said parts against each other, mechanism for rotatively advancing one of said means, and mechanism for causing reverse rotary movements of the other means during rotary advance of the first means, substantially as described.

4. In a machine for assembling the body and closure parts of containers, in combination, coacting means, for pressing said parts against each other, mechanism for rotatively advancing one of said means, and mechanism for causing reverse rotary movements of the other means during rotary advance of the first means, substantially as described.

5. In combination, coacting means, rotative on a common axis, for bringing the closure and body parts of containers into assembled relation to each other, mechanism for rotatively advancing one of said means, and mechanism for causing reverse rotary movements of the other means during rotary advance of the first means, substantially as described.

6. In combination, coacting means for bringing the body and closure parts of containers into assembled relation to each other, one of said means having a thrust movement toward and from the other, and each of said means being rotative on an axis extending longitudinally of its line of thrust movement, means for rotatively advancing one of said means and mechanism for causing reverse rotary movements of the other means during rotary advance of the advanced means, substantially as described.

7. In a machine for assembling the body and closure parts of containers, substantially continuously moving rotary means for advancing the body parts successively, and pressure-exerting means, oscillatory concentrically with the first means, for forcing the closure parts into assembled relation with the body parts, substantially as described.

8. Mechanism for affixing the closure parts to the body parts of containers comprising a closure supporting member having a closure-contracting means, means for laterally advancing the body parts successively, means for laterally moving said member back and forth, and means for effecting a movement of said member and a body part, the one toward the other, during the lateral movement of said member in one direction, substantially as described.

9. Mechanism for affixing the closure parts to the body parts of containers comprising separate supporting members for the closure and body parts, the closure-supporting member having a closure-contracting cavity, means for laterally advancing the supporting member for the body parts, means for laterally moving said closure-supporting member back and forth, and means for effecting movement of one of said members toward the other during each lateral movement of the closure supporting member in one direction, substantially as described.

10. In combination, with means, discharging in a definite direction, for supplying the closure parts, means for assembling the closure and body parts comprising a sealing device oscillatory, in said direction and reversely, out of and into closure-receiving relation to the supplying means, substantially as described.

11. In combination, with means, discharging in a definite direction, for supplying the closure parts, means for assembling the closure and body parts comprising a sealing device oscillatory, in said direction and reversely, out of and into closure-receiving relation to the supplying means, and means for moving said sealing device and effecting the delivery thereto of a closure part on each movement of said sealing device into closure-receiving relation to the supplying means, substantially as described.

12. In combination, coacting means for assembling the closure and body parts in sealing relation to each other, means for supplying the closure parts disposed relatively laterally of said coacting means, one of said coacting means being oscillatory toward and from the supplying means, and means for oscillating the oscillatory one of said coacting means, substantially as described.

13. In a machine for assembling the closure and body parts of containers, in combination, means for supplying the container parts of one kind, coacting means for assembling the closure and body parts in sealing relation to each other, movable together to advance said parts, one of said coacting means being adapted to carry the container parts supplied by the supplying means and oscillatory toward and from the supplying means, substantially as described.

14. In a machine for assembling the closure and body parts of containers, in combination, means for supplying the container parts of one kind, means for assembling the body and closure parts including means for advancing the container parts of one kind past the assembling position and a supporting member for the container parts of the other kind oscillatory into and out of receiving relation to the supplying means, in one direction with the advancing means, substantially as described.

15. In combination, with means for assembling the closure and body parts including an oscillatory thrust member having thrust movement substantially longitudinally of its axis of oscillation and also including a sealing device disposed eccentrically of said axis and carried by said member, means for feeding a closure to the sealing device on the oscillatory movement thereof with said member in one direction, substantially as described.

16. A rotary advancing member for the articles being operated upon, said member comprising two parts rotatably adjustable the one on the other around the axis of rotation of said member, each of said parts having spaced article-engaging projections, substantially as described.

17. In combination, with a rotary shaft, coacting means for assembling the container body and closure parts, one of said means being rotative, and the other oscillatory, around said shaft as an axis, and means for transmitting motion from the shaft to each of said means, substantially as described.

18. In combination, with a rotary shaft, mechanism for assembling the container body and closure parts comprising an advancing member for one of said parts rotative, and a holding member for the other of said parts oscillatory, around said shaft as an axis, and means for transmitting from said shaft rotary movement to the advancing member and oscillatory movement to the holding member, substantially as described.

19. In combination, with a rotary shaft, mechanism for assembling the container body and closure parts comprising an advancing member for one of said parts rotative, and a holding member for the other of said parts oscillatory, around said shaft as an axis, and means for transmitting from said shaft rotary movement to the advancing member, substantially as described.

20. In combination, with a rotary shaft, mechanism for assembling the container body and closure parts comprising an advancing member for one of said parts rotative, and a holding member for the other of said parts oscillatory, around said shaft as an axis, and means for transmitting from said shaft oscillatory movement to the holding member, substantially as described.

21. In combination, with a rotary shaft, coacting means for assembling the container body and closure parts, one of said means being rotative, and the other oscillatory, around said shaft as an axis, and one of said means being also movable substantially longitudinally of said shaft, and means for transmitting movement from the shaft to each of said means, substantially as described.

22. In combination, a suitable supporting part, a container-receiving sealing means comprising a socket detachably secured to said part and a sealing device interposed between said part and a portion of the socket and contained within and supported by the latter, and a plunger normally movable in said parts and in the container-axis toward the entrance to the sealing means, said device limiting said movement of the plunger, substantially as described.

23. In a machine for assembling the body and closure parts of containers, means for advancing the container parts of one kind in succession, a carrier oscillating back and forth and a device for bringing the container parts of the other kind into assembled relation with the first-named container parts, said device having a rectilinear back and forth movement in the carrier crosswise of the path of movement of the latter, substantially as described.

24. In a machine for assembling the body and closure parts of containers, a supporting means and coacting means for pressing said parts against each other including a carrier having rectilinear thrust movement in the supporting means and being revoluble on an axis extending longitudinally of its line of thrust movement and a supporting member for one of the container parts arranged in the carrier and yieldable therein substantially longitudinally of said line, said carrier having a slip-friction grip on said member and the supporting means having means to limit the movement of said member with the carrier in one direction, substantially as described.

25. Coacting means for bringing the body and closure parts of containers into position to be assembled with each other, one of said means including a carrying device for the parts of one kind movable in a continuous path toward the other means, then laterally, then from the other means, and then laterally, and also including a carrying member for said device movable rectilineally toward and from said other means, substantially as described.

26. A machine for assembling the body and closure parts of containers including a frame having a support for the parts of one kind, a carrying structure for the parts of the other kind having movement toward and from the support and also laterally, and means for effecting said movements of said structure including an actuating member rotative on an axis extending through the supporting plane of said support and having cam-ways controlling said movements of said structure and respectively deflected toward and from the support and toward and from said axis, substantially as described.

27. In a machine for assembling the body and closure parts of containers, the combination of the frame including a vertical bearing part, and means for bringing the body and closure parts into position to be assembled with each other including a carrying structure for the parts of one kind rotative around the axis of and movable vertically on said bearing part, and means for oscillating and imparting up and down movements to said structure, substantially as described.

28. In a machine for assembling the body and closure parts of containers, the combination of the frame including an upstanding bearing part and means for bringing the body and closure parts into position to be assembled with each other including a carrying structure for the parts of one kind rotative around the axis of and movable vertically on said bearing part, and means, carried by said bearing part, for oscillating and imparting up and down movements to said structure, substantially as described.

29. In a machine for assembling the body and closure parts of containers, the combination of the frame including an upstanding vertically adjustable bearing part and means for bringing the body and closure parts into position to be assembled with each other including a carrying structure for the parts of one kind rotative around the axis of and movable vertically on said bearing part, and means, carried by said bearing part, for oscillating and imparting up and down movements to said structure, substantially as described.

30. Means for assembling the bodies and closures of containers including the frame, a carrying structure for the parts of one kind oscillatory around and movable longitudinally of a vertical axis on a part of the frame, and means for imparting vertical and oscillatory movements to said structure including a transmission member moving transversely of said axis and having sliding engagement with said structure, substantially as described.

31. A machine for assembling the body and closure parts of containers including a support for the parts of one kind, a carrying structure for the parts of the other kind having movement toward and from the support and also laterally, and means for effecting said movements of said structure including an actuating member rotative on an axis extending from the support and having camways respectively deflected toward and from the support and toward and from said axis, substantially as described.

32. A machine for assembling the body and closure parts of containers including a support for the parts of one kind, a carrying structure for the parts of the other kind having movement toward and from the support and also laterally, and means for effecting said movements of said structure including an actuating member rotative on an axis extending from the support and having cam-ways respectively deflected toward and from the support and toward and from said axis, the first-named cam-way being engaged by said structure, and a power-transmission member movable laterally in said frame, engaged with the second-named cam-way and having sliding engagement with said structure, substantially as described.

In testimony, that we claim the foregoing we have hereunto set our hands this 29th day of October, 1910.

BENJAMIN ADRIANCE.
AMOS CALLESON.

Witnesses:
 WM. C. HORN,
 LOUIS STUMPF.